United States Patent

[11] 3,624,028

| [72] | Inventor | William O. Drake<br>Bartlesville, Okla. |
|---|---|---|
| [21] | Appl. No. | 36,699 |
| [22] | Filed | May 12, 1970 |
| [45] | Patented | Nov. 30, 1971 |
| [73] | Assignee | Phillips Petroleum Company |

[54] PROCESSING OF FLAME-RESISTANT POLYMERS
8 Claims, No Drawings

[52] U.S. Cl. ................................................. 260/45.75 R,
252/8.1 R, 260/2.5 R, 260/31.8 B, 260/31.8
PO, 260/31.8 W, 260/45.85 R, 260/45.7 R

[51] Int. Cl. ....................................................... C08f 45/58

[50] Field of Search ............................................. 260/45.7,
31.8 PO, 31.8 B, 31.8 W, 45.85, 2.5 R, 45.75 R;
252/8.1

[56] References Cited
UNITED STATES PATENTS

| 3,365,505 | 1/1968 | Norell ........................... | 260/648 |
| 3,441,524 | 4/1969 | Burger et al. ................. | 260/45.7 |

*Primary Examiner*—Donald E. Czaja
*Assistant Examiner*—V. P. Hoke
*Attorney*—Young and Quigg

ABSTRACT: The processability temperature limit for polymers containing flame retardants such as antimony oxide and bis(halogenated cyclohexyl) halogenated alkanes is raised by the addition of an aromatic ester.

3,624,028

PROCESSING OF FLAME-RESISTANT POLYMERS

This invention relates to flame resistant polymers having an increase in the processability temperature limit.

It is known that readily flammable polymers can be made difficulty flammable by the addition of halogenated compounds. It also is known that these polymers can be flameproofed with antimony trioxide employed in combination with the halogenated compound.

It now has been found that the processing temperature limitation for these flame-proofed polymers is raised by incorporating small amounts of an aromatic ester. The ester in combination with the halogenated compound and antimony trioxide gives added melt stability to the polymer. The polymer is thus more resistant to thermal degradation and hence, the melt temperature can be raised, if desired, to improve the processabiility without experiencing an undue rise in melt flow. The raising of the usual temperature range is especially important when processing higher molecular weight polymers since, in general, somewhat higher processing temperatures are required for these higher molecular weight polymers.

Accordingly, it is an object of this invention to provide flame-proofed polymers having improved processing temperature limitations.

Other objects, advantages and features of this invention will be apparent to those skilled in the art from the following disclosure and appended claims.

The polymers that can be employed in this invention are homopolymers or copolymers of 1-olefins having two to eight carbon atoms per molecule. Specific examples of these polymers include branched and linear polyethylenes, propylene-ethylene copolymers and the like. Preferred are propylenes with a density of about 0.9 grams per cc., a melting point of about 340° F. (optically determined), and a melt flow of from about 0.1 to 15 as determined by ASTM D 1238–62T (Condition L).

The halogenated compounds that can be employed in this invention have the formula:

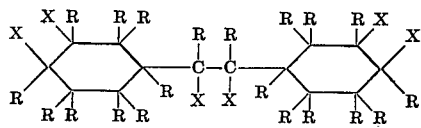

where R is hydrogen or a methyl or ethyl radical and X is chlorine or bromine. These halogenated compounds can be produced by any process known in the art, for example, see U.S. Pat. No. 3,365,505 issued on Jan. 23, 1968 to John R. Norell, assignor to Phillips Petroleum Company.

Specific examples of these halogenated compounds are:

1,2-bis(3,4-dichlorocyclohexyl)-1,2-dichloroethane
1,2-bis(3,4-dibromocyclohexyl)-1,2-dibromoethane
1,2-bis(1-methyl-3,4-dichlorocyclohexyl)-1,2-dichloroethane
1,2-bis(2-methyl-3,4-dibromocyclohexyl)-1,2-dibromoethane
1,2-bis(3-ethyl-3,4-dichlorocyclohexy)-1,2-dichloroethane
1,2-bis(4-methyl-3,4-dibromocyclohexyl)-1,2-dibromoethane
1,2-bis(5-ethyl-3,4-dichlorocyclohexyl)-1,2-dichloroethane
1,2-bis(2,2-dimethyl-4,5-dibromocyclohexyl)-1,2-dibromoethane
3,4-bis(3,4-dichlorocyclohexyl)-3,4-dichlorohexane
1,2-bis(2,6-dimethyl-3,4-dichlorocyclohexyl)-1,2-dichloroethane
2,3-bis(3-methyl-3,4-dibromocyclohexyl)-2,3-dibromobutane
1,2-bis(1,3-dimethyl-3,4-dichlorocyclohexyl)-1,2-dichloroethane
2,3-bis(4-methyl-3,4-dibromocyclohexyl)-2,3-dibromobutane
1,2-bis(1,4-dimethyl-3,4-dichlorocyclohexyl)-1,2-dichloroethane
1,2-bis(2,3-dimethyl-4,5-dibromocyclohexyl)-1,2-dibromoethane
2,3-bis(1,3,4-trimethyl-3,4-dichlorocyclohexyl)-2,3-dichlorobutane
1,2-bis(2,5,6-trimethyl-3,4dibromocyclohexyl)-1,2-dibromoethane
1,2-bis(2,6-diethyl-3,4-dichlorocyclohexyl)-1,2-dichloroethane
3,4-bis(4-ethyl-3,4-dibromocyclohexyl)-3,4-dibromohexane
1-(3-methyl-3,4-dichlorocyclohexyl)-2-(2-methyl-6-ethyl-3,4-dichlorocyclohexyl)-1,2-dichloroethane, and
1-(3,4-dibromocyclohexyl)-2-(2-methyl-3,4-dibromocyclohexyl)-1,2-dibromoethane.

Mixtures of two or more of these halogenated compounds can be used.

The aromatic esters of this invention are derived from aromatic acids in which two or more carboxylic groups are directly joined to a benzene nucleus. Representative acids include o, m, and p-phthalic acids, benzene tricarboxylic acid (1, 2, 4) such as trimellitic acid, benzene tetracarboxylic acid (1, 2, 3, 4) such as prehnitic acid and the like. The acids are esterified with aliphatic straight or branched chain alcohols having from six to 13 carbon atoms per molecule. Representative alcohols include hexanol-1, 2-methyl-pentanol-1, 1-heptanol, 1-octanol, 2-ethylhexanol, isooctyl alcohol, 1-decanol, 1-tridecanol, 1-nonanol, isononyl alcohol, isodecyl alcohol, and the like.

Representative examples of suitable esters include -di-n-octyl phthalate, diisooctyl phthalate, di-n-hexyl phthalate, di-n-nonyl phthalate, didecyl phthalate, di(2-ethylhexyl diisodecyl phthalate, ditridecyl phthalate, octyl decyl phthalate, decyltridecyl phthalate, isooctyl isodecyl phthalate, n-octyl di-n-decyl trimellitate, tri-n-octyl trimellitate, triisooctyl trimellitate, diisooctyl mono isodecyl trimellitate, triisodecyl trimellitate, 1,2-diisooctyl-3,4-di-n-nonyl prehnitate, 1,2,3,4-tetra-n-hexyl prehnitate and the like.

The esters that can be employed in this invention can be produced by any method known in the art, for example, see Kirk-Othmer, Encyclopedia of Chemical Technology, Second Edition, Volume 15, pages 444–487. These esters are formed by reacting the acid or its anhydride with an alcohol using an acid catalyst, if desired. Mixed esters also can be produced by suitable control of conditions during esterification and by using different alcohols, e.g. octyl decyl phthalate. A mixture of esters can be used in the practice of the invention.

The halogenated compound is employed in amounts of 1.5 to 20 parts by weight per 100 parts by weight of the polymer. Antimony trioxide is used in amounts of 0.5 to 20 parts by weight per 100 parts by weight of polymer. The amount of ester employed ranges from 0.1 to 0.8 parts by weight per 100 parts by weight of polymer, preferably 0.3 to 0.6 parts by weight per 100 parts by weight of polymer.

The production of the flame-proofed polymers can be carried out in various manners. For example, intimate mixtures of polymer and flame-proofing agents can be prepared by mixing the polymer and the halogen compound at an elevated temperature in an extrusion press or kneader. These components also can be dissolved in a common solvent, the solution admixed with the polymer, and the solvent subsequently removed. In the case of granular or beadlike plastic compositions, the surface of the granule may be coated.

The esters of this invention are incorporated into the polymer melt along with the stabilizers and flame retardants by means of a Banbury mixer, extruder, or a Brabender mixer, roll mill and the like. The mixing temperature is preferably between 370° and 425° F.

It is to be understood that the compositions of this invention can also have the usual fillers, dyes, pigments, plasticizers, antistatic agents, stabilizing agents and the like, incorporated therein, if desired. These compounds are well known in the art and for the sake of brevity will not be repeated at this time. Common polyolefin stabilizers such as hindered phenols and dialkylthiodipropionates also can be present.

The advantages of this invention are further illustrated by the following examples. The reactants and proportions and other specific conditions are presented as being typical and should not be construed to limit the invention unduly.

EXAMPLE

Polypropylene of a nominal 3.5 melt flow was mixed with 0.1 php. (parts per hundred parts) Irganox 100[1], 0.2 php. DLTDP[2], 4.0 php. BrBCE[3], 2.0 php. antimony trioxide and 0.25 php. of the ester indicated in the table at 374° F. under nitrogen for 10 minutes in a Brabender mixer at 50 rpm's to approximate normal processing conditions. The following results were obtained.

TABLE I

| Run Number | Ester | Melt Flow After Processing |
| --- | --- | --- |
| 1 | none (control) | 14.0 |
| 2 | di-(2-ethylhexyl) phthalate | 5.4 |
| 3 | ditridecyl phthalate | 4.1 |
| 4 | diisononyl phthalate | 4.9 |
| 5 | di-n-octyl phthalate | 6.0 |
| 6 | diisodecyl phthalate | 5.0 |
| 7 | triisooctyl trimellitate | 6.0 |
| 8 | diisooctyl mono isodecyl trimellitate | 7.1 |
| 9 | diisooctyl phthalate | 6.0 |
| 10 | diisooctyl phthalate (50%) + diisodecyl phthalate (50%) | 4.2 |

[1] tetrakis[methylene(3,5-tert-butyl-4-hydroxydrocinnamate]methane Geigy Industrial Chemicals
[2] dilaurylthiodipropionate, Evans Chemetics
[3] 1,2-bis(3,4-dibromocyclohexyl)-1,2-dibromoethane.

These runs clearly demonstrate that by incorporating small amounts of the indicated esters into the flame-resistant polymer, the melt flow increase otherwise experienced during processing is significantly decreased. Therefore, the processing temperature limitation for flame-resistant polymers is raised by incorporating small amounts of an aromatic ester into the flame-resistant mixtures since the effects of processing temperatures upon the melt flow of the polymer is decreased.

Although this invention has been described in considerable detail, it must be understood that such detail is for the purpose of illustration only and that many variations and modifications can be made by one skilled in the art without departing from the scope and spirit thereof.

I claim:

1. A flame-resistant composition consisting essentially of at least one polymer of a 1-olefin having 2 to 8 carbon atoms per molecule; 1.5 to 20 parts by weight per 100 parts by weight of said polymer of halogenated compound represented by the formula:

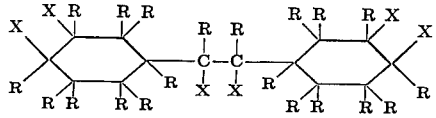

wherein R is hydrogen or a methyl or ethyl radical and X is chlorine or bromine; 0.5 to 20 parts by weight per 100 parts by weight of said polymer of antimony trioxide; and 0.1 to 0.8 parts by weight per 100 parts by weight of said polymer of an aromatic ester derived from an aromatic acid having 2 or more carboxylic groups directly joined to a benzene nucleus and an aliphatic alcohol having from six to 13 carbon atoms per molecule.

2. A composition according to claim 1 wherein said polymer is polyethylene, polypropylene or propylene-ethylene copolymer and said halogenated compound is 1,2-bis(3,4-dichlorocyclohexyl)-1,2-dichloroethane, 1,2-bis(3,4-dibromocyclohexyl)-1,2-dibromoethane or a mixture thereof.

3. A composition according to claim 1 wherein said polymer is polypropylene and said halogenated compound is 1,2-bis(dibromocyclohexyl)-1,2-dibromomethane.

4. A composition according to claim 1 wherein 0.3 to 0.6 parts by weight per 100 parts by weight of said polymer of said aromatic ester is employed.

5. A composition according to claim 1 wherein said acid is o-phthalic acid, m-phthalic acid, p-phthalic acid, trimellitic acid, prehnitic acid and said alcohol is hexanol-1,2-methylpentanol-1, 1-heptanol, 1-octanol, 2-ethylhexanol, isooctyl alcohol, 1-decanol, 1-tridecanol, 1-nonanol, isononanol alcohol or isodecyl alcohol.

6. A composition according to claim 1 wherein said ester is di-n-octyl phthalate, diisooctyl phthalate, di-n-hexyl phthalate, di-n-nonyl phthalate, didecyl phthalate, di(2-ethylhexyl)phthalate, diisodecyl phthalate, ditridecyl phthalate, octyl decyl phthalate, decyltridecyl phthalate, isooctyl isodecyl phthalate, n-octyl di-n-decyl trimellitate, tri-n-octyl trimellitate, triisooctyl trimelliate, diisooctyl mono isodecyl trimellitate, triisodecyl trimellitate, 1,2-diisooctyl-3,4-di-n-nonyl prehnitate, or 1,2,3,4-tetra-n-hexyl prehnitate.

7. A composition according to claim 1 wherein said ester is di-(2-ethylhexyl) phthalate, ditridecyl phthalate, diisononyl phthalate, di-n-octyl phthalate, diisodecyl phthalate, triisooctyl trimellitate, diisooctyl mono isodecyl trimellitate, diisooctyl phthalate, or diisooctyl phthalate and diisodecyl phthalate.

8. A composition according to claim 1 in which two of said esters are used.

* * * * *